Patented Mar. 23, 1937

2,074,926

UNITED STATES PATENT OFFICE 2,074,926

MEANS FOR REPAIRING PUNCTURES IN PNEUMATIC TIRES

Willy Kruse, Hamburg, Germany, assignor to Autosan Corporation of America, New York, N. Y., a corporation of New York No Drawing. Application June 1, 1934, Serial No. 728,623. Renewed February 19, 1936. In Germany February 24, 1934

8 Claims. (Cl. 134—17.5)

Means for sealing punctures of various kinds are already known. There are two main-sorts, one of which is intended for sealing punctures in the rubber coverings of cars and usually employed in form of pastes, and the other sort, which is intended to be permanently in the inner tire to effect the sealing in the very moment of demolition. Horsehair, cork, mica, etc., mixed with other ingredients are employed for the latter. In spite of numerous proposals on this subject none of them has been put into practice, which shows very clearly, that till now it has been impossible to meet the exigencies.

It has been suggested a compound for sealing punctures of the following composition: 60 parts mica, 25 parts rubber, 10 parts cork and 5 parts saw-dust. To this admixture were added very small quantities of tragacanth, spirit, formaline and glycerine. Carrying the invention into effect the compound has been proved not to be reliable for sealing punctures. Compared with other compositions likewise containing mica of various fineness a composition of mica is used according to the present invention in form of small particles in three grades of fineness, but to equal parts to obtain a sliding mass in the inner tube and a sealing of the punctures without delay; the composition contains further glue soluble in the cold and consists of an admixture, by weight, of the following ingredients: 60 parts mica, 20 parts agglutinants, 10 parts talc, 8 parts cork, 2 parts pulverized caoutchouc. This composition is diluted in water of the three-to-seven fold quantity. The said quantities suggest only the most suitable composition of course, so that small deviations from these amounts do not affect the nature of this invention. The fineness of the mica is for one-third of the size of a pin's head, for the second third of the fineness of screen mesh of 0.25 sq. cm. and for the last third of the fineness of screen mesh of 0.5 sq. cm. The cork is suitably employed in the size of a pin's head to twice the size of a pin's head, and equally the pulverized caoutchouc. To this admixture is further added glycerine 25% compared with the quantity of the water and about 3% of an 8% formaline-solution. As agglutinants have been found most suitable glues containing principally starch xanthogenate or cellulose-ester such as acetate.

Having described my invention I claim:

1. A semi-plastic composition for repairing punctures in pneumatic tubes, comprising approximately 3 to 7 parts of water and an intimate mixture of one part of solid substances including an agglutinant; said mixture consisting of about 20% of the agglutinant and 80% of water-insoluble fillers in pulverized form including mica as the main constituent, the mica constituent in the proportion of about two-thirds of said water-insoluble solid fillers, said mica constituent being in equal parts of three grades, namely dust size, 0.25 sq. cm. size and 0.50 sq. cm. size; said solid fillers functioning to facilitate continuous sliding of the composition within the tube and all of the constituent amounts being given in weight proportions.

2. A semi-plastic composition for repairing punctures in pneumatic tubes, comprising approximately 3 to 7 parts of water and an intimate mixture of one part of solid substances including an agglutinant; said mixture consisting of about 20% of an agglutinant; 20% of water-insoluble solid fillers and about 60% of mica, said mica being in equal parts of three grades, namely dust size, 0.25 sq. cm. size, and 0.50 sq. cm. size.

3. A semi-plastic composition according to claim 2 in which said water-insoluble solid fillers other than mica comprise talcum, rubber and cork all in pulverized form.

4. A semi-plastic composition according to claim 2 in which said water-insoluble solid fillers other than mica comprise about 10% talcum, 2% rubber and 8% cork all in pulverized form.

5. A semi-plastic composition according to claim 2 in which said water-insoluble solid fillers comprise about 10% talcum, 2% caoutchouc and 8% cork all in pulverized form; said mica constituent being iron-free.

6. A semi-plastic composition according to claim 2 in which said water-insoluble solid fillers other than mica comprise about 10% talcum, 2% caoutchouc and 8% cork all in pulverized form; said mica constituent being iron-free and the following additional constituents being added, namely, 25% of glycerine and 3% of formaline solution, both percentages of the quantity of water used.

7. A semi-plastic composition for use in tubes for pneumatic tires, comprising an intimate mixture of solid substances including an agglutinant, and a sufficient amount of water to cause the composition to be semi-plastic and adhere to the wall of the tube, said mixture of solid substances and agglutinant containing about 60 parts mica in substantially equal parts of three grades, namely dust size, about 0.25 square centimeter size and about 0.5 square centimeter size, about 20 parts of water-insoluble solid fillers including cork, and about 20 parts of cellulose ester as the agglutinant, said solid fillers functioning to facilitate continuous sliding of the composition within the tube during operation of the tire.

8. A semi-plastic composition for repairing punctures in pneumatic tubes, comprising approximately 3 to 7 parts of water and an intimate mixture of one part of solid substances including cellulose-ester as an agglutinant; said mixture consisting of about 20% of the agglutinant and 80% of water-insoluble fillers in pulverized form including mica as the main constituent, the mica constituent in the proportion of about two-thirds of said water-insoluble solid fillers, said mica constituent being in equal parts of three grades, namely dust size, 0.25 sq. cm. size and 0.50 sq. cm. size; said solid fillers functioning to facilitate continuous sliding of the composition within the tube and all of the constituent amounts being given in weight proportions.

WILLY KRUSE.